United States Patent [19]

Hassler et al.

[11] Patent Number: 5,450,564
[45] Date of Patent: Sep. 12, 1995

[54] METHOD AND APPARATUS FOR CACHE MEMORY ACCESS WITH SEPARATE FETCH AND STORE QUEUES

[75] Inventors: Joseph A. Hassler; Gregory K. Deal, both of West Chester; Timothy A. Koss, Pottstown; Stephen F. Heil, West Chester, all of Pa.

[73] Assignee: Unisys Corporation, Plymouth Meeting, Pa.

[21] Appl. No.: 13,254

[22] Filed: Feb. 3, 1993

Related U.S. Application Data

[63] Continuation of Ser. No. 518,911, May 4, 1990, abandoned.

[51] Int. Cl.[6] .................. G06F 13/18; G06F 5/06; G06F 13/364
[52] U.S. Cl. .................. 395/495; 395/250; 395/292; 395/859; 395/860; 364/DIG. 1
[58] Field of Search .............. 395/400, 425, 250, 375; 364/200 MS File, 900 MS File; 370/85.1 MS

[56] References Cited

U.S. PATENT DOCUMENTS

| | | | |
|---|---|---|---|
| 4,270,167 | 5/1981 | Koehler et al. | 395/325 |
| 4,345,309 | 8/1982 | Arulpragasam et al. | 395/425 |
| 4,354,232 | 10/1982 | Ryan | 395/425 |
| 4,403,288 | 9/1983 | Christian et al. | 395/275 |
| 4,430,701 | 2/1984 | Christian et al. | 395/425 |
| 4,633,387 | 12/1986 | Hartung et al. | 395/650 |
| 4,636,946 | 1/1987 | Hartung et al. | 395/425 |
| 4,773,041 | 9/1988 | Hassler et al. | 395/400 |
| 4,785,398 | 11/1988 | Joyce et al. | 395/425 |
| 4,884,197 | 11/1989 | Sachs et al. | 395/425 |
| 4,899,275 | 2/1990 | Sachs et al. | 395/425 |
| 4,914,652 | 4/1990 | Nguyen | 370/85.5 |
| 4,933,835 | 6/1990 | Sachs et al. | 395/425 |
| 4,979,167 | 12/1990 | McCool | 370/85.4 |
| 4,985,825 | 1/1991 | Webb, Jr. et al. | 395/425 |
| 4,995,041 | 2/1991 | Hetherington et al. | 371/40.1 |
| 5,091,846 | 2/1992 | Sachs et al. | 395/250 |
| 5,119,485 | 6/1992 | Ledbetter, Jr. et al. | 395/425 |
| 5,123,095 | 6/1992 | Papadopoulos et al. | 395/375 |
| 5,136,582 | 8/1992 | Firoozmand | 370/85.1 |
| 5,185,871 | 2/1993 | Frey et al. | 395/375 |
| 5,212,778 | 5/1993 | Dauy et al. | 395/400 |
| 5,226,126 | 7/1993 | McFarland et al. | 395/375 |

*Primary Examiner*—Glenn Gossage
*Assistant Examiner*—B. James Peikari
*Attorney, Agent, or Firm*—Ratner & Prestia

[57] ABSTRACT

A two-way set associative cache memory system for a parallel-pipelined computer system uses separate queue structures to hold main memory fetch and store requests generated by the central processing unit (CPU). A memory access unit, coupled between the cache memory system and the CPU selects the next request to be processed by the main memory from between the requests at the heads of the fetch and store queues. The request at the head of the fetch queue is preferred over the request at the head of the store queue unless the memory partition to be used by the fetch request is still busy with a previous request while the partition to be used by the store request is idle. Data retrieved from the main memory replaces data in the cache according to an algorithm that prefers empty pages within a set to pages that contain data and prefers pages that do not have pending update requests scheduled to pages that do have pending update requests scheduled. In the event that only pages having pending update requests are found, input requests to the cache are inhibited until at least one fetch request for a page in the set is completed and the page is no longer marked as having a pending update request.

10 Claims, 7 Drawing Sheets

METHOD AND APPARATUS FOR CACHE MEMORY ACCESS WITH SEPARATE FETCH AND STORE QUEUES

This application is a continuation of application Ser. No. 07/518,911 filed May 4, 1990, now abandoned.

BACKGROUND OF THE INVENTION

This invention relates to cache memory systems for use in a parallel-pipelined computer system and in particular to such a cache memory having an efficient interface with main memory.

A conventional computer system includes a central processing unit (CPU) a memory subsystem and an input/output (I/O) subsystem. In some computer systems, the principle connection among these three entities is a single bidirectional bus. In other systems, the CPU and memory are connected by one bus while the I/O subsystem is connected to the memory by another bus. It is well known that, in either configuration, the performance of the system is at least partly dependent on the speed at which data can be transferred between the CPU and the memory.

In general terms, this problem has been addressed by increasing the "bandwidth" of the bus. As used herein, the bandwidth of a bus is a measure of the amount of data which can be transferred over the bus in a unit time interval.

There are, however, many ways in which the apparent bandwidth of the memory bus may be increased. One method is to provide a wider bus, that is to say one which conveys a greater number of bits in parallel between the CPU and the memory. Another method is to provide faster memory. This may be done either by using higher performance memory components or by partitioning the memory so that multiple memory fetch operations may proceed in parallel.

Interleaving is a particular type of memory partitioning. In an interleaved memory subsystem, memory cells having successive addresses are assigned to respectively different partitions. This partitioning allows the fetch operations for consecutively addressed words to be overlapped. In a four-way interleaved memory subsystem, for example, data for any four memory cells having consecutive addresses may be fetched or stored in parallel. Thus, the apparent memory cycle time of an interleaved memory is a fraction of the memory cycle time of the actual memory devices as long as a significant portion of memory operations access consecutive memory cells.

Partitioning does not speed up all memory accesses, however, since successive memory access requests which map onto the same memory partition will occur at the memory cycle time of the actual memory devices.

Another way in which the bandwidth of data transfers between the CPU and memory may be increased is to use high-performance devices in the memory subsystem. This method tends to be of limited utility since both the devices themselves and the hardware used to support them tend to increase the cost of the computer system without producing a proportional increase in performance.

High-performance memory devices of this type, however, are widely used in cache memory systems which interface between the CPU and the main memory subsystem. A cache memory attempts to take advantage of any tendencies toward temporal or spatial locality of reference in computer programs by fetching data from cells surrounding each memory cell accessed by the program. Data in these surrounding cells is held in a relatively small, high-speed memory local to the CPU until it is overwritten by data from other memory access requests. While this data is in the cache, it may be accessed by the CPU without substantial delay.

While cache memories may tend to increase system performance for programs that frequently access data in relatively small data sets, they present problems when large volumes of data are accessed by the program controlling the CPU. For these programs, data values in the cache memory are continually being replaced to satisfy the requests issued by the CPU. Due to the operation of the cache, each of these requests produces multiple memory access requests which may delay subsequent requests. In addition, when new data to be added to the cache must replace some of the existing data, a data replacement algorithm is invoked to determine which of the existing data entries in the cache is to be replaced by the new data. This replacement algorithm may significantly delay memory accesses by the CPU or it may entail the use of relatively costly dedicated electronic devices.

SUMMARY OF THE INVENTION

The present invention is embodied in a computer system having a cache memory which provides an interface between a CPU and a main memory. The cache memory is coupled to the main memory by two queues, one for data to be fetched from the memory and one for data to be stored into the memory. The interface between the cache and main memories includes circuitry which selects between the next fetch request and the next store request for the next memory access to be performed.

According to one aspect of the invention, the selection circuitry is conditioned to prefer fetch requests to store requests.

According to another aspect of the invention, the main memory is partitioned and the selection circuitry compares the requested partitions of both the store and fetch requests to the partitions accessed by each of the last N memory requests, where N is an integer. The selection circuitry favors access requests to other partitions over requests to the partitions of these last N memory requests.

According to yet another aspect of the invention, the cache memory is organized as a two-way set associative memory and the data replacement algorithm takes into account such factors as impending replacement requests for either set of data values at the requested location.

DETAILED DESCRIPTION OF THE INVENTION

Overview

Figure 1:
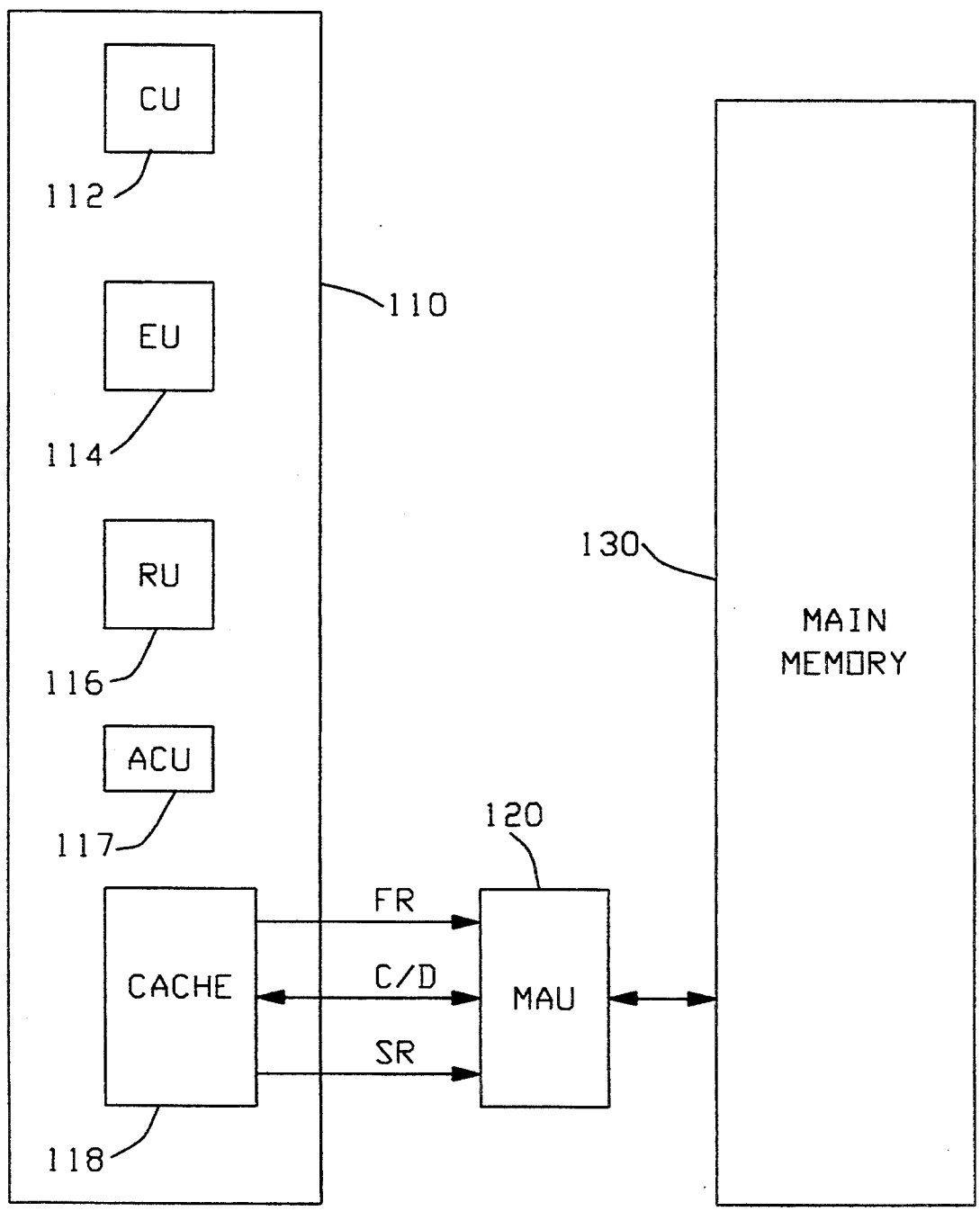
FIG. 1 is a block diagram of a computer system which includes an embodiment of the present invention.

FIG. 1 is a block diagram of a parallel-pipelined computer system in which multiple central processing units (CPU's) may be coupled to a main memory 130. Only one CPU 110 is shown in FIG. 1. The CPU 110 includes a code unit (CU) 112, an execution unit (EU) 114, a reference unit (RU) 116 and a cache memory 118. The code unit retrieves instructions from a main memory 130 and partially decodes them. Any memory references in the code processed by the code unit are handled by the RU 116. The data cache memory 118 of the CPU 110 is coupled to main memory 130 via a memory access unit (MAU) 120.

When the RU 116 attempts to resolve a memory reference from an instruction, it passes a virtual memory address to an address conversion unit (ACU) 117 which translates the virtual address into an absolute address. The ACU 117 then passes the absolute address to the cache memory 118. If the referenced address is found, the cache memory 118 either returns the referenced data item to the EU 114 or performs the store operation into the cache using data provided by the EU.

If, however, the referenced address is not found, the cache memory 118 conditions the MAU 120 to make an access request to the main memory 130. As shown in FIG. 1, the cache 118 may simultaneously make two types of access request, a memory fetch request via the bus FR and a memory store request via the bus SR. These parallel requests are analyzed by the MAU 120 to determine if either one would make better use of the memory resources. To this end, two tests are made by the MAU 120. First, the memory access unit 120 determines if either one of the access requests would use a memory partition that may be still busy handling a previous access request. If so, the non-interfering request is preferred over the potentially interfering request. The second test prefers memory fetch requests to memory store requests, that is to say, fetch requests are given a higher priority than store requests. This second test is only performed if the first test does not establish a preferred request.

The cache memory 118, used in this embodiment of the invention, is a two-way set associative memory. Consequently, each addressed location in the memory includes two four-word data sets. Whenever a new data request is made and both of its corresponding data sets are occupied, the cache memory 118 chooses one set to be replaced by the new data. The algorithm for choosing the set to be replaced avoids choosing a set for which a pending request already exists. If, however, both sets have pending requests, one of the sets is selected at random.

The exemplary cache memory 118 is a purgeless cache. Data values are stored in the cache memory 118 in four-word sets and the status of any four-word set is held in the main memory 130. Thus, if processor A fetches a four-word set from memory and intends to modify the data in the set, the cache status entry for the data in the main memory 130 will indicate that the data in the set is held by processor A exclusively. Any attempt by, for example, processor B to access the data in main memory will be unsuccessful until the modified data has been written back into the main memory 130 by processor A.

Alternatively, processor A may request data from memory which will not be modified. In this instance, the cache status entry for the four-word set will indicate that processor A has the data in a shared state. Processor B may also access shared data but may not gain exclusive access to the data until the set has been invalidated in processor A's cache.

Access to data in the memory 130 is controlled by a demand scheme. A processor which needs to access data can cause the processor which currently holds the data in its associated cache to give it up. Thus, if a task running on processor A requests exclusive access to data which is held with share status by processor B, The memory 130 will send the data to processor A and simultaneously send a purge command for the addressed location to processor B. This command will cause processor B to mark the data set invalid in its cache. It is noted that the memory 130 issues purge commands which invalidate copies of data held in the various cache memories 118 coupled to the memory 130. This system has a reduced processing overhead relative to a system in which the cache 118 or the MAU 120 would be assigned the task of invalidating copies held by other cache memories.

When processor A requests share access to data which is held exclusively by processor B, the memory 130 cannot send the addressed data to the MAU 120 of processor A but, instead, sends a return code to processor B which causes processor B to write the data set back into memory. Once the data has been returned to memory and its cache status has been updated, the data may be sent to processor A.

Detailed Description

Figure 2:
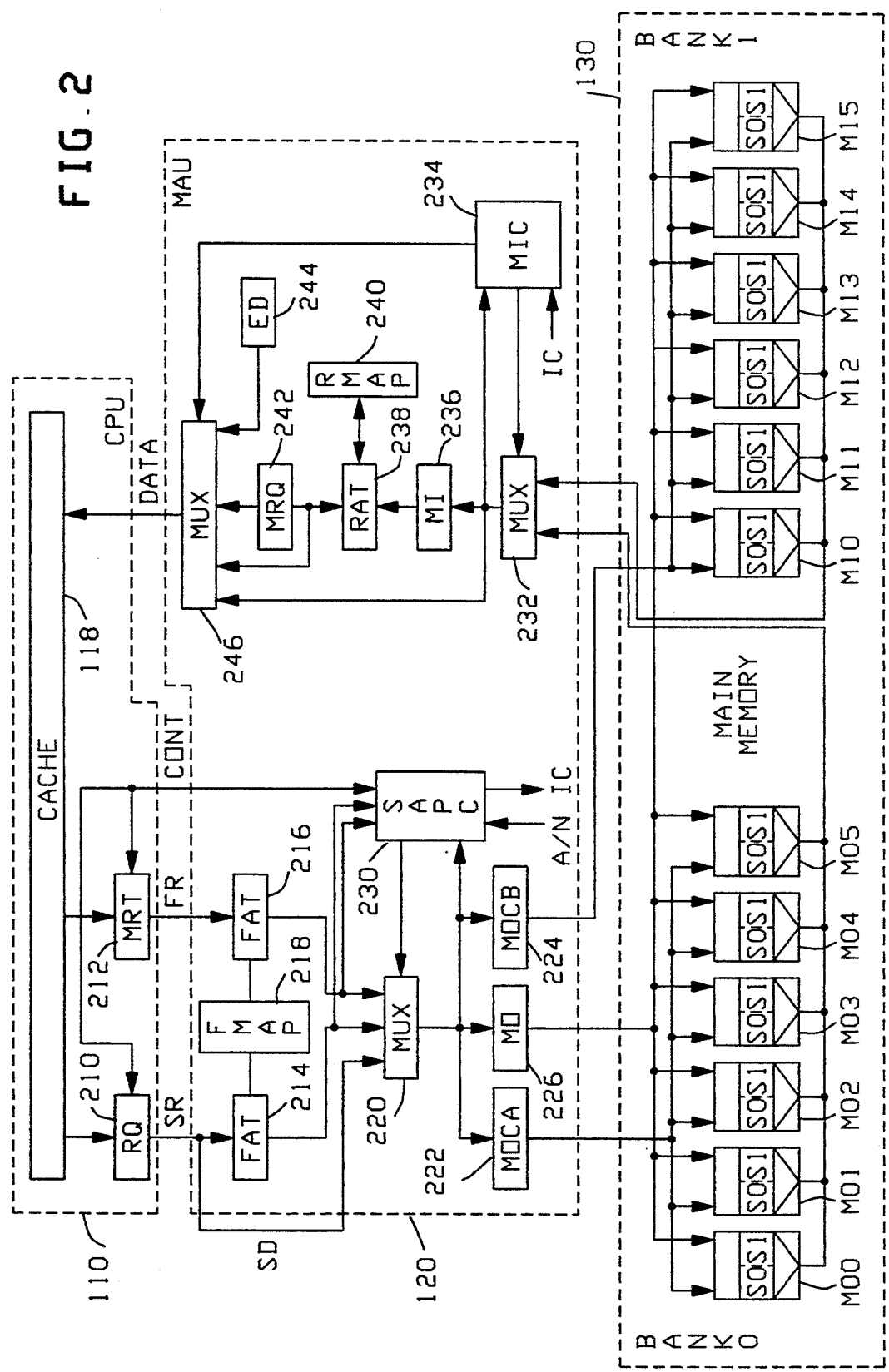
FIG. 2 is a block diagram which shows details of the memory access unit (MAU) of the computer system shown in FIG. 1.

FIG. 2 is a block diagram of the MAU 120 which couples the cache memory 118 to the main memory 130. As shown in FIG. 2, the main memory 130 is divided into two memory banks (BANK 0 and BANK 1). Each bank, in turn, is divided into six slots (M00 through M05 and M10 through M15, respectively) and each slot is divided into two partitions which are controlled by respective servers S0 and S1.

On the occurrence of a cache miss or when a data set in the cache is to be replaced, the cache 118 issues, respectively, a fetch request, through the cache fill list/memory reference table (CFL/MRT) 212, or a store request, through the replace queue (RQ) 210. As described below, in reference to FIG. 4, the CFL/MRT 212 and the RQ 210 are circular queues. The cache memory 118 places memory requests into each of these queues and the MAU 120 removes requests from the queues.

The next entries to be taken from the queues RQ and CFL/MRT are applied to the forward address translation (FAT) circuitry 214 and 216 respectively. The FAT circuitry 214 and 216 are coupled to a forward address map (FMAP) 218 which provides the translation from the absolute memory address held in the queue entry to the physical address of the data in the main memory 130. The translated addresses provided by the FATs 214 and 216 and data values to be stored into the main memory 130, provided by the RQ 210 are applied to respectively different data input ports of a multiplexer 220.

The operation of the MAU 120 is described with reference to FIGS. 2, 2a and 2b. As shown in FIG. 2, the multiplexer 220 and the RQ 210 and CFL/MRT 212 are controlled by signals provided by the server availability priority control (SAPC) circuitry 230. As set forth below in reference to FIG. 3, the SAPC 230, at step 252 of FIG. 2a, conditions the multiplexer 220 to select either the next store request from the RQ 210 or the next fetch request from the memory reference table 212 as the next memory operation to be performed. In addition, when a memory operation has been selected, the SAPC updates the read pointer in the appropriate one of RQ 210 or CFL/MRT 212 via a control bus CONT.

The output port of the multiplexer 220 is coupled to three registers, two memory operation control registers (MOCA 222 and MOCB 224) and an MAU output register (MO) 226. The registers 222, 226 and 224 are controlled by signals (not shown) provided by the SAPC circuitry 230. In response to these control signals, the address values provided by the FATs 214 and 216 are selectively loaded into the MO register 226 and the appropriate control bits are set in either MOCA 222 or MOCB 224, depending on which memory bank is to receive the request. The data values provided by the replace queue 210 are always loaded into the MAU output register 226. The output port of the register MOCA 222 is coupled to the address input port of each slot of BANK 0 while the output port of the register MOCB 224 is coupled to the address input port of each slot of BANK 1. The MO register 226 has two output ports, one coupled to the data bus of BANK 0 and one coupled to the data bus of BANK 1.

Figure 2A:
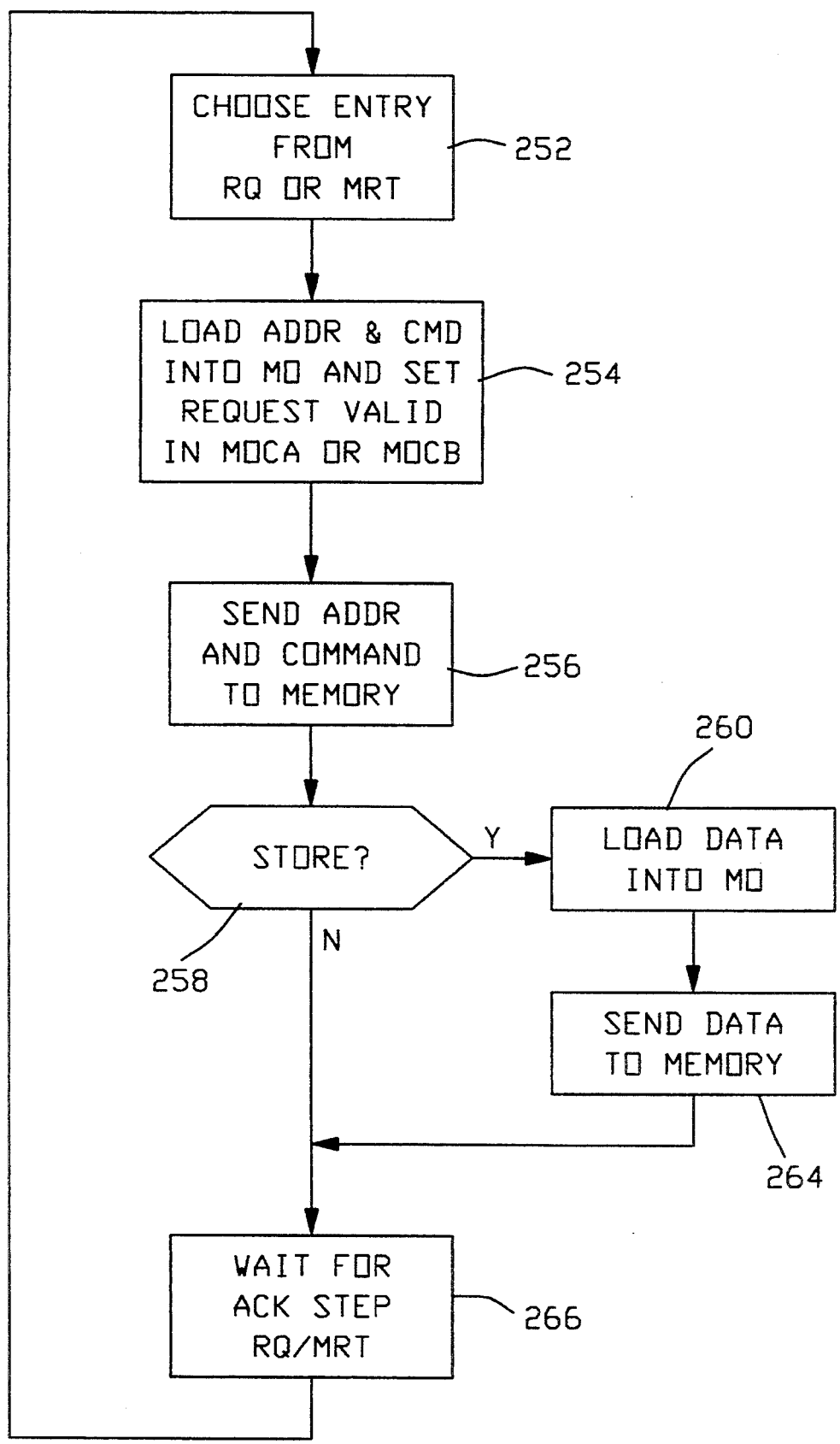
FIGS. 2a and 2b are flow chart diagrams which are useful for explaining the operation of the circuitry shown in FIG. 2.

In response to a store request from the replace queue 210, the server availability priority control circuitry 230, at step 254 of FIG. 2a, first conditions the multiplexer 220 to pass the store address value provided by the FAT 214. Based on memory bank information contained in the store address value, the SAPC 230 then enables the appropriate one of the registers MOCA 222 or MOCB 224. The address value defines a slot and a server within the slot which is to receive the data. In step 256, as this address value is stabilized in the slots of the selected memory bank, the SAPC 230, at step 260, conditions the multiplexer 220 to apply the data value from the replace queue 210 to the MO register 226 and indicates to the memory 130, via the MOCA 222 or MOCB 224 that there is valid data in the MO register. The main memory 130 acknowledges receipt of the store command by sending a signal to the SAPC 230 via the signal path A/N. The SAPC 230 waits for this acknowledgement at step 266 and then branches to step 252 to choose the next memory request to be processed.

The signal provided by the SAPC 230 to the selected server conditions the server to transfer the data from the MO register 226 into the addressed memory cell. All memory control signals (e.g. write enable) are generated by logic in the server. In this embodiment of the invention, while there is an acknowledgement that the server has received the store command, there is no acknowledgement from the server that the memory write operation has occurred.

Store requests from the replace queue 210 may involve a zero word (i.e. unmodified data) or a four word (i.e. modified data) group. In the case of a four word group, the SAPC 230 applies successive data values from the replace queue 210 to the MO register 226 and asserts the appropriate control signals (e.g. DATA VALID) in MOCA 222 or MOCB 224 to condition the main memory 130 to store the data values.

If a fetch request from the CFL/MRT 212 is selected at step 252, the SAPC 230, at step 254, conditions the multiplexer 220 to pass the address value provided by the FAT 216 to the MO register 226 and sets the appropriate control signals (e.g. REQUEST VALID) in MOCA 222 or MOCB 224. At step 256, the control signals and the fetch request are sent to the selected memory bank. Upon receiving the fetch request, the main memory 130 sends an acknowledgement to the SAPC 230 via the control line A/N. When, at step 266, this acknowledgement is received, the SAPC 266 branches to step 252 to select the next memory operation.

Figure 2B:
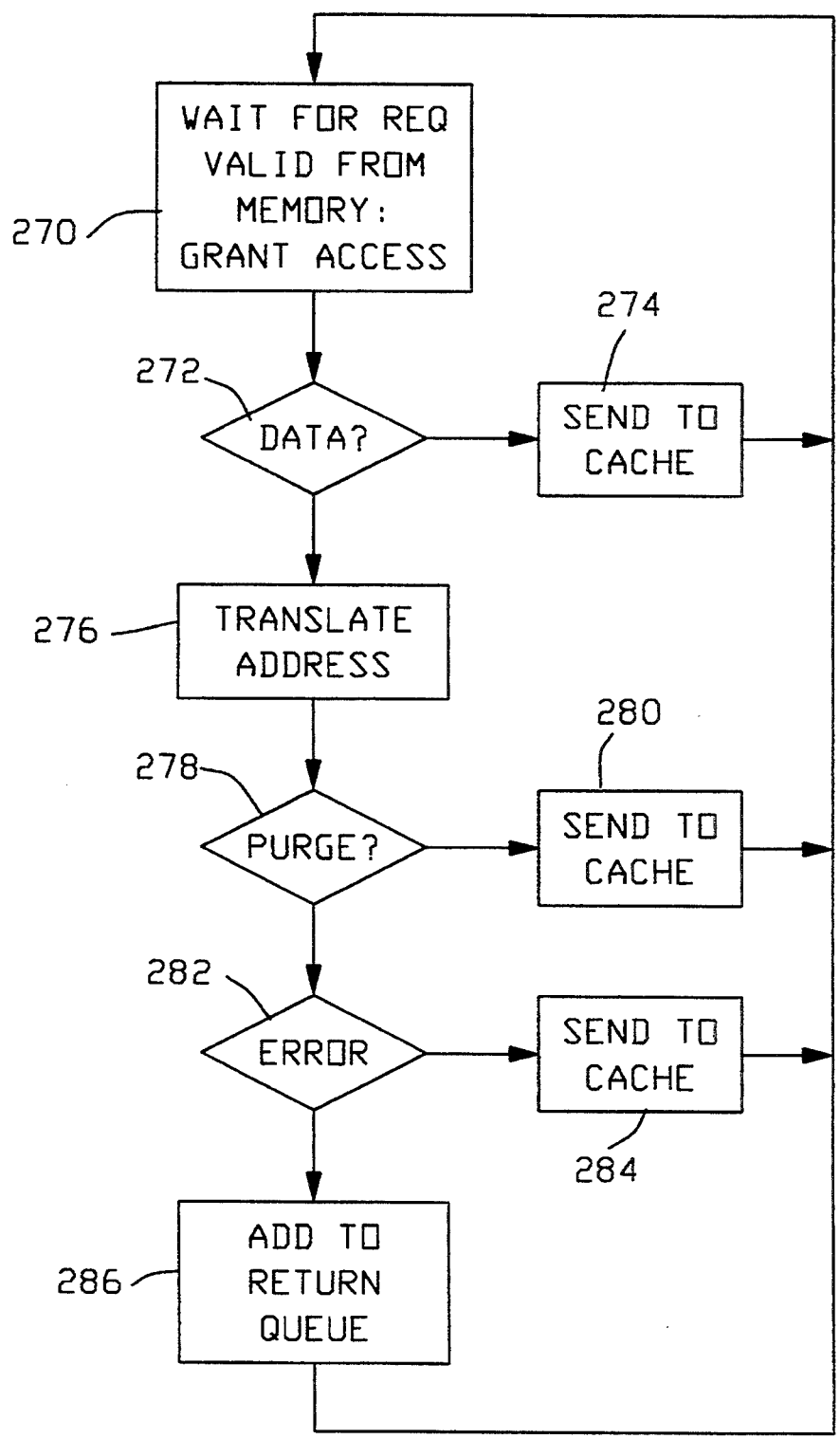

When the fetch operation is complete, and data is ready to be sent to the cache 118, the server, at step 270 of FIG. 2b, sends a control signal (e.g. REQUEST VALID) back to the SAPC 230 via the control line A/N. In response to this control signal from the selected server, the SAPC 230 emits an input control signal IC to a MAU input controller (MIC) 234. When the MIC 234 receives this signal, it conditions the hardware elements on the right side of FIG. 2 to pass the data from the main memory 130 to the CPU 110. The first step in this process is to condition a multiplexer 232 to pass a value from the selected memory bank to an MAU input (MI) register 236 and to a multiplexer 246.

The value provided by the memory 130 includes either one word of data or one word which includes a cache status entry and an address in the memory 130 of a data word. The cache status portion of this value is monitored by the MAU input controller 234 which determines whether the data, a return code, or a purge command should be sent to the requesting processor.

If, at step 272, it is determined that data is to be sent to the cache 118, it is passed, at step 274, directly through the multiplexer 246 to the cache 118. In this instance, the other three words of the four word data set are provided in sequence by the memory 130. In this embodiment of the invention, the address to be used for these data words is retained by the cache and is associated with the data via a job number that is assigned to the fetch request, by the cache 118, and is transferred through the memory 130 with the data.

A return command or a purge command is not the result of a fetch operation from the CPU to which it is directed and, so has no corresponding entry in the cache 118 of that CPU. Consequently, at step 276, the address values to be sent to CPU are translated from physical addresses in the memory to absolute addresses, that is to say to address values used by the CPU. To perform this translation, the MIC 234 loads the cache status value and the address into the MI register 236. The address value is applied to reverse address translation (RAT) circuitry 238 which translates the physical address into its corresponding absolute address according to the reverse address map RMAP 240.

If, at step 278, the cache status value indicates that a purge command is to be sent to the CPU 110, the cache status word and the address are applied, at step 280, directly from the output port of the RAT 238 to the cache 118 through the multiplexer 246. Alternatively, if a return command is indicated, the cache status word and the virtual address are placed, at step 286, into a MAU return queue (MRQ) 242, the output port of which is coupled to an input port of the multiplexer 246.

A fourth input port of the multiplexer 246 is coupled to receive an error code provided by an error detector (ED) 244. The ED 244 detects errors in the data being returned from the main memory (e.g. parity errors, invalid addresses or the results from fetch instructions that have been superseded by a branch instruction that redirected the flow of the program). The MAU input control circuitry 234, at step 282 detects the presence of an error condition and, at step 284, conditions the multiplexer 246 to pass the error code to the cache 118. If an error has occurred in a transfer from memory, the step 282 will detect the error and pass the error code value to the cache 118. In this instance, the value provided by the memory 130 will not be treated as data, a purge command or a return command.

When the SAPC 230 has processed a command from the replace queue 210 or from the memory reference table 212, and the main memory 130 has acknowledged receiving the command, the SAPC 230 sends a signal to the RQ 210 or CFL/MRT 212, respectively, via the bus CONT. This signal conditions the respective RQ 210 and CFL/MRT 212 to advance the appropriate queue pointer to point to the next entry. As set forth below, in reference to FIG. 3, the SAPC 230 retains the addresses of the last four commands from the RQ and CFL/MRT, these addresses are applied to the SAPC 230 from the output of the multiplexer 220 and are used to determine which of the two requests provided by the RQ 210 and CFL/MRT 212, respectively, should be handled next.

To perform this command selection, the SAPC 230 records the physical addresses used for the last four memory operations. These addresses indicate which memory banks, which slots and which servers were used by the respective memory operations. At any time, the physical addresses to be used by the memory requests at the top of the replace queue 210 and memory reference table 212 are available at the output ports of the respective forward address translation circuits 214 and 216. These physical addresses are simultaneously compared with the last four physical addresses by the SAPC circuitry 230.

Figure 3:
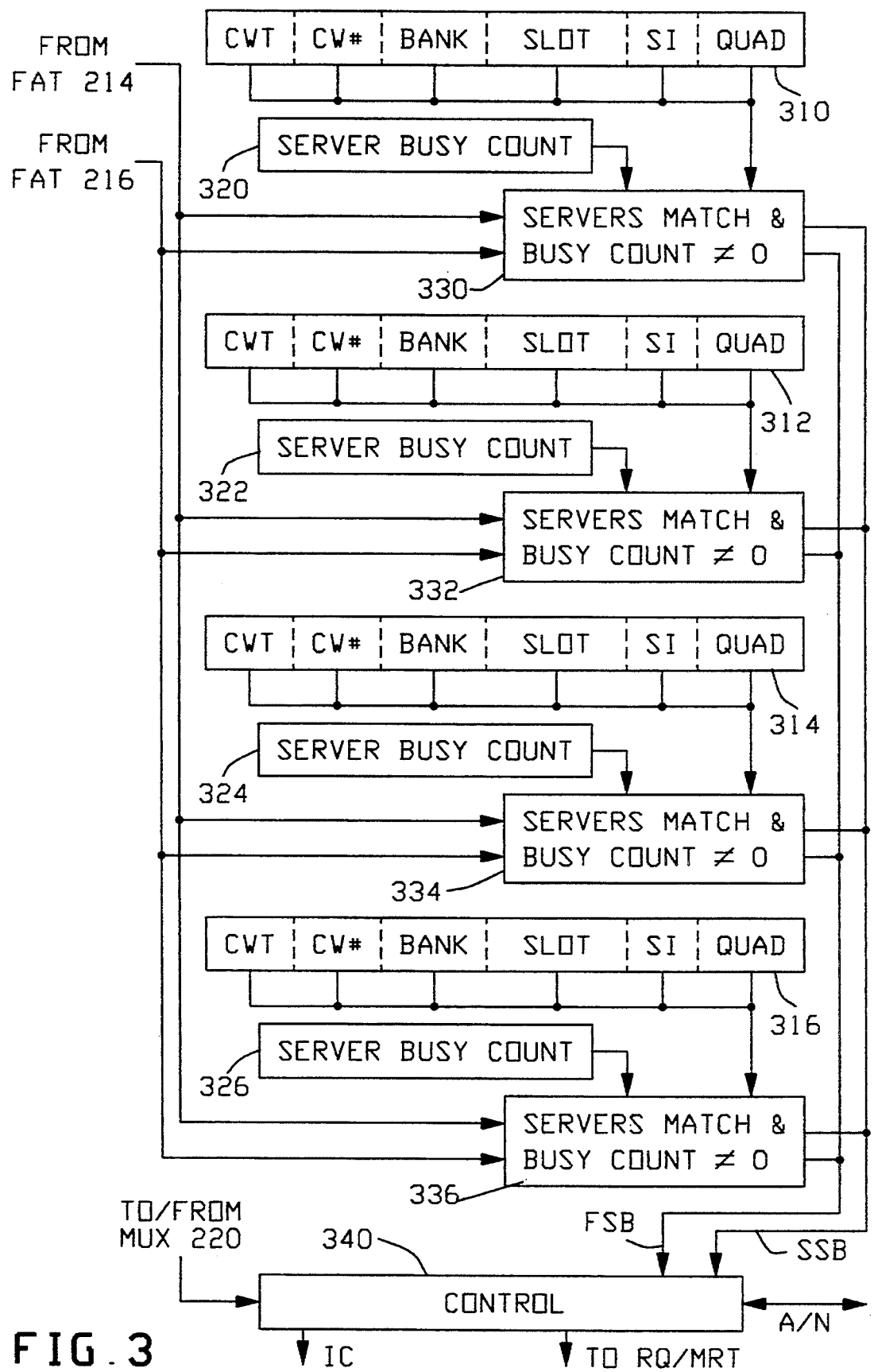
FIG. 3 is a block diagram which shows details of the server availability priority control (SAPC) circuitry used in the MAU circuitry shown in FIG. 2.

FIG. 3 is a block diagram which illustrates the structure of the SAPC circuitry 230. Information on the last four processed memory operations are stored in the four registers 310, 312, 314 and 316. Each of these registers is temporarily associated with a particular server in the main memory 130. For each of the registers 310, 312, 314 and 316, there is a corresponding server busy counter 320, 322, 324 and 326, respectively. The server busy counter is a timer which indicates the length of time that a server is busy with a memory request. This counter is loaded with a predetermined time value when the SAPC circuitry 230 sends the operation to the main memory 130 and is decremented each system clock period afterward until its value equals zero.

As each memory operation is scheduled, the physical address of the most recently initiated memory operation and its counter value are loaded into the next available register pair. The contents of the registers 310, 312, 314 and 316 and the contents of the respective busy counters 320, 322, 324 and 326 are applied to respective comparator circuits 330, 332, 334 and 336. Each of these comparators is also coupled to receive the physical memory addresses of the next store and fetch commands from the FAT circuitry 214 and 216, respectively.

Each of the comparators 330, 332, 334 and 336 compares the stored address from its associated register with each of the addresses from the FAT circuits 214 and 216. If the address of the server to be used either by the next store or the next fetch operation matches that of the stored server address, and if the server busy count is not equal to zero then the server is presumed to be busy. The comparators 330, 332, 334 and 336 each have two output terminals, one indicating the result of the fetch comparison and the other indicating the result of the store comparison. The respective output terminals of each of the comparators are tied together in a wired-OR configuration. The coupled fetch terminals form a fetch server busy (FSB) signal and the coupled store terminals form a store server busy (SSB) signal.

In this configuration, if the signal FSB has a logic-one value then the address from the FAT circuitry 216 matches at least one of the addresses stored in the registers 310, 312, 314 and 316 and the corresponding server is still busy. Similarly, if the signal SSB has a logic-one value, the address from the FAT circuitry 214 matches one of the stored addresses and its corresponding server is still busy.

The signals FSB and SSB are applied to the SAPC controller 340. Based on these signals, the controller 340 selects whether the next entry in the replace queue 210 or the next entry in the memory reference table 212 is the next memory operation to be performed. If FSB is logic-one and SSB is logic-zero then the store is preferred over the fetch. Otherwise the fetch is preferred over the store. Fetch operations are preferred over store operations when the decision parameters are equal because the CPU waits for the results of a fetch operation while it does not wait for a store operation. By preferring fetch operations when all else is equal, the MAU 120 helps to increase the perceived performance of the CPU.

Figure 4:
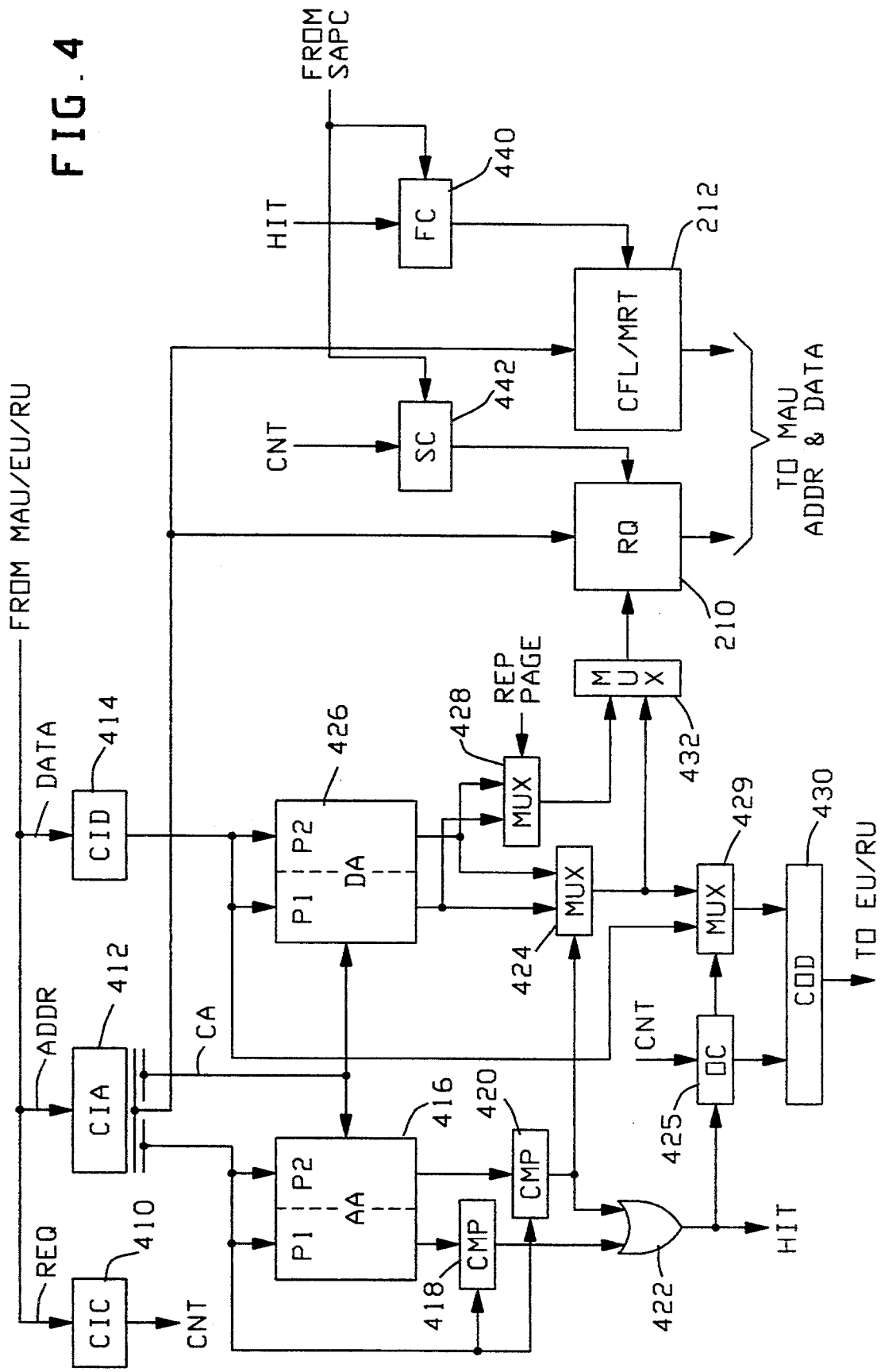
FIG. 4 is a block diagram which shows details of the cache memory circuitry of the computer system shown in FIG. 1.

FIG. 4 is a block diagram which illustrates the structure of the cache memory 118 of the CPU 110. As set forth above, the exemplary cache memory 118 is a two-way set associative memory. In this configuration, 4096 words are arranged in two pages, each page containing 512 four-word data sets. If the address bits are numbered from 0 to 28 with bit 28 being the most significant bit (MSB) and bit 0 being the least significant bit (LSB) the address of a set in the cache memory is denoted by bits 2 through 10. Bits 11 through 28 are stored in an address area (AA) 416 of the cache memory to fully identify the set and the corresponding data words are stored in four corresponding word locations of a data area (DA) 426.

In the exemplary embodiment of the invention, the cache memory 118 has an input interface which is coupled both to the EU 114 (or RU 116) and to the MAU 120. Via this interface, the cache 118 receives a cache command, a cache input address (CIA) and, optionally, a cache input data value (CID). These are stored in the cache input controller (CIC) and the registers 412 and 414, respectively.

The CIC 410 used in this embodiment of the invention includes a sequencer which is responsive to the various cache commands to control the other components of the cache memory 118. For the sake of simplicity, these control lines are not shown in FIG. 4. The operation of the cache 118 is described below for five commands: fetch and store commands originating in the EU 114 or RU 116 and store, purge and return commands originating in the MAU 120.

On any access to the cache memory 118, the first step is to determine if the value addressed by CIA has been captured in the cache. To this end, the CIC 410 applies bits 2 through 10 of the address value stored in register 212 to both the address area 416 and the data area 426. Simultaneously, bits 11 through 28 are applied to first input ports of respective comparators 418 and 420. The second input ports of these comparators are coupled to receive the data stored in the respective pages, P1 and P2 at the addressed locations of the address area 416. If the addressed set has been captured by the cache memory 118, then one of the comparators 418 or 420 will signal a match. The output signals of the comparators 418 and 420 are logically ORed together by an OR gate 422. The output signal, HIT, provided by this gate indicates whether the data set has been captured by the cache memory 118.

For a fetch operation from the RU 116, the CIC 410 applies the two parts of the cache input address to the address area 416, as described above, and simultaneously applies bits 2 through 10 of the address value to the data area 426. The output signal of the comparator 420 is applied to a multiplexer 424 which selectively passes the addressed data value from either page P1 or page P2 of the data area 426. The signal HIT is applied to an output controller (OC) 425 which develops control signals for a multiplexer 429 and a cache output data register (COD) 430. The OC 425 conditions the multiplexer to pass either the data value from the addressed location of the data area 426 or the cache input data value from the register 414. The OC 425 conditions the COD 430 to load the output value of the multiplexer 429 only if the signal HIT is logic-true.

Otherwise, the signal HIT conditions the CIC 410 to reserve a four-word data set in either page P1 or page P2 of the cache at the address indicated by bits 2 through 10 of the CIA register. The algorithm for selecting which page is to hold the data fetched from memory is described below in reference to FIG. 5. The logic-false signal HIT also conditions a fetch controller 440 to create a fetch queue entry in the CFL/MRT 212 for the addressed location. It also conditions a store controller 442 to place a 0, 3, or 4 word store request into the replace queue 210. This entry is handled in due course by the MAU 120 as set forth above. When the data values are returned by the MAU 120 they are written into the reserved data set. When the store request is placed into the replace queue 210, one word of the four word data set is entered during the fetch operation that caused the data set to be entered into the replace queue. The remaining words are copied into the replace queue 210 sequentially after the first word. This technique saves time in the fetch operation by reducing the amount of time used to store the data in the data set being replaced by the fetch operation.

As set forth above, the fetch and store operations are handled by separate queues and operations from the fetch queue are preferred over operations from the store queue. This scheme results in a time saving for bringing new data into the cache 118 since the fetched data may be stored in the cache 118 before the cache status for the data being replaced is updated.

For a store command from the EU, the cache input address and data values are applied to the address and data areas 416 and 426 as described above. The CIC 410 conditions the appropriate page of the data area 426 to store the cache input data value, from the register 414, into the addressed word of the addressed data set.

A store request from the MAU 120 adds a data set to the cache memory 118. As set forth above, the data provided by the MAU 120 is the result of a fetch command issued by the cache 118 through the CFL/MRT 212. The data returning from the MAU 120 is keyed to an address held by the CFL/MRT by a job number that is associated with the data. In response to this job number, the CIC 410 conditions the register 412 to load this address value as the cache input address value. Bits 2 through 10 of this value and a page indication value are used to address the address area 416 and the data area 426. As the data values are stored into the data area 426, bits 11 through 28 of the address value are stored into the address area 416.

The data set to be used to hold this data will have been preselected during the handling of the fetch command that generated the store command from the MAU 120. The data set selection algorithm is described below in reference to FIG. 5.

Since the RU 116 had originally requested this data, the requested data value is loaded into the COD register 430 at the same time it is written into the data area 426 of the cache 118. The cache input controller 410 and the logic-zero signal HIT condition the multiplexer 429 to pass the cache input data value from the register 414 to the COD register 430 and condition the register 430 to load the value. As set forth above, this value is applied to the RU 116.

In response to a purge command from the MAU 120, the address value provided by the MAU 120 is loaded into the CIA 412 and, if the signal HIT is logic-true, the addressed entry in the appropriate page of the cache 118 is marked invalid. If HIT is logic-false, no action is taken.

In response to a return command from the MAU 120, the provided address value is loaded into the CIA 412 and, if the signal HIT is logic-true, the addressed entry in the appropriate page is written back into main memory using the replace queue 210. If HIT is logic-false, no action is taken.

Figure 5:
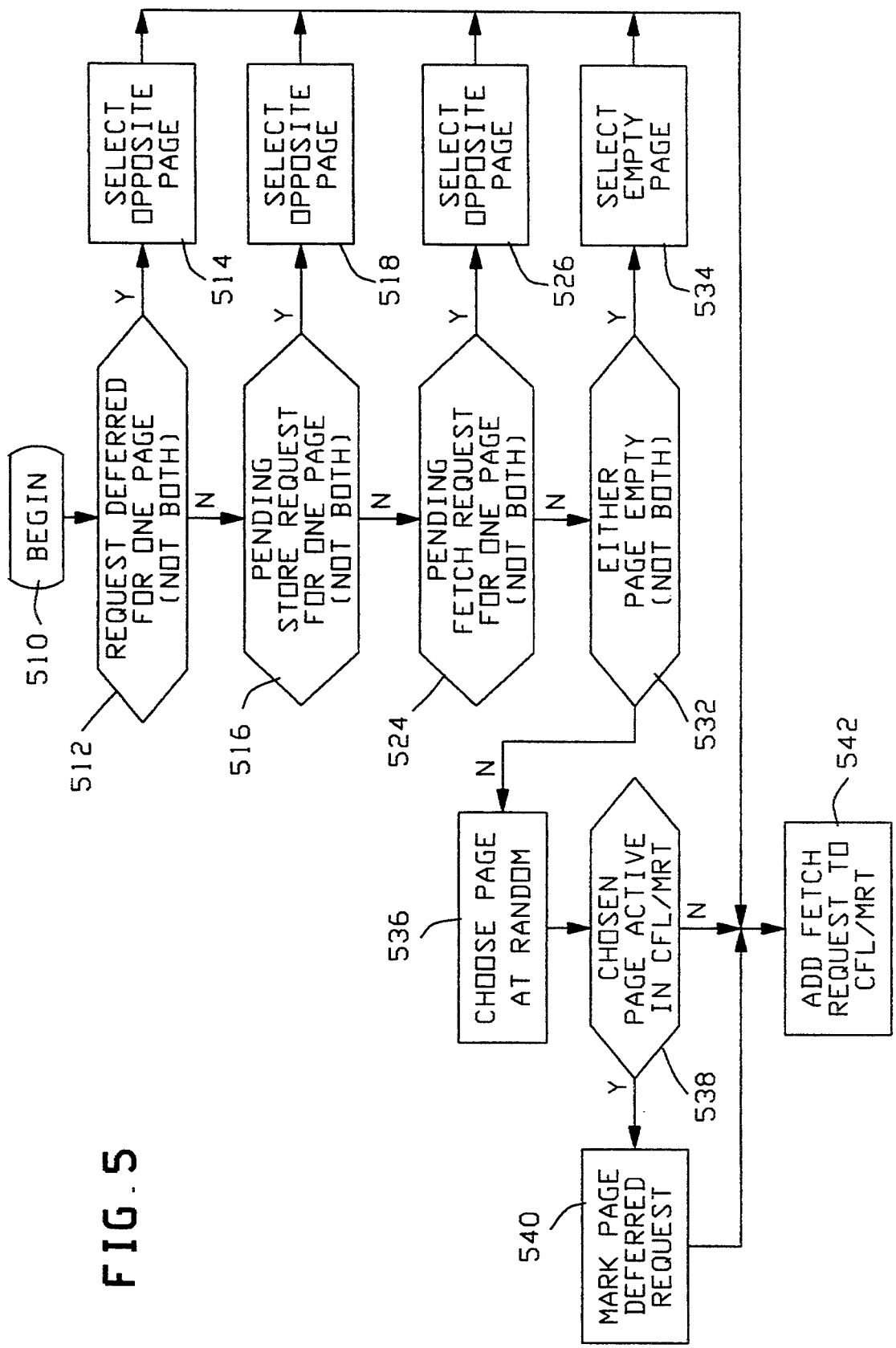
FIG. 5 is a flow chart diagram which is useful for explaining the operation of the cache memory circuitry shown in FIG. 4.

The algorithm for determining which of a pair of page locations in the cache 118 is to be replaced by a new data set is set forth in FIG. 5. At step 510, a memory fetch request for the new data set is received at the cache memory 118. The first step in the algorithm is to determine if either of the two pages, having the same cache address as the new set, is marked as having a deferred replace request scheduled. If so, then the set which is not marked for a deferred replace request is selected at step 514.

A page is marked for a deferred replace request only when, upon attempting to select one of the pages for a new data set, the CIC 410 finds both pages already reserved for outstanding data fetch operations. In this instance, the CIC 410 enters a deferred replace request for one of the two pages. No action is taken by the MAU 120 on a deferred request until the outstanding fetch request for the specified page at the addressed cache location returns. At this time, the newly returned set is immediately scheduled to be replaced, the page containing the set is marked as being reserved and a fetch request is entered into the CFL/MRT 212.

As set forth below, only one of the two pages at any given address may be marked for a deferred replace when a replace request is to be processed. The processing of that request, however, may cause the other page at the given address to be marked for a deferred replace.

If neither of the addressed pages is found to be marked for a deferred request at step 512, the algorithm, at step 516, checks for pending store requests. If one of the two pages is found to have a pending store request, that is to say a pending modification of a data word by the EU 114, step 518 is executed which selects the page that does not have an outstanding store request.

If neither page or both pages are found to have an outstanding store request then, step 524 is executed to determine if either of the pages or the selected page has an active fetch request, that is to say, a fetch request that is marked as active in the CFL/MRT 212. If so, the step 526 is executed which selects the page opposite to the one having the pending fetch request.

If neither page or both pages are found to have a pending fetch request, then step 532 is executed. This step determines if either page (but not both pages) is empty. If only one page is found to be empty, it is selected at step 534. If both pages are in use or if both pages are empty, one of the pages is selected at random at step 536.

If, at step 538, the selected page which was chosen to be replaced at one of the steps 514, 518, 526, 534 or 536, is marked as active in the CFL/MRT 212, then, at step 540, this fetch is marked as requiring a deferred replace. When marked in this way, the fetch cannot be issued to the MAU 120. This action blocks other units (e.g. the EU 114 and RU 116) from sending requests to the cache memory 118. These units remain locked out of the cache memory 118 until the active fetch request for the page is completed. At step 542, the fetch request is loaded into the CFL/MRT 212.

If a loaded request is marked as requiring a deferred replace, then, when the active request for this page is completed, the deferred fetch becomes active and may be issued to the MAU 120. Due to the pipelined operation of the cache memory 118, however, it is possible that a second access request for a particular addressed cache location is already being processed when the suspension occurs. If the cache address of this current request is the same as that of the deferred request, then a deferred replace request for the other page at the addressed cache location is entered into the CFL/MRT 212 for the current request.

An improved cache memory system has been described in which separate store and fetch queues are maintained to make memory access operations more efficient and to improve the apparent performance of the processing elements coupled to the cache memory system. While this invention has been described in terms of an exemplary embodiment, it is contemplated that it may be practiced as outlined above with modifications within the spirit and scope of the appended claims.

The invention claimed is:

1. In a computer system having a main memory, which is arranged in a plurality of groups of storage locations, and a central processing unit (CPU) including a cache memory system and distinct fetch and store queues, a method for transferring data, including operand data, between the cache memory system and the main memory in response to store and fetch requests initiated by the CPU, the method comprising the steps of:

scheduling a plurality of the fetch requests received from the CPU in the fetch queue to transfer the data, including the operand data, from ones of the storage locations in the main memory to the cache memory system, wherein each of the fetch requests has a respective address value in the main memory and only the fetch requests are scheduled in the fetch queue;

scheduling a plurality of the store requests received from the CPU in the store queue to transfer the data, including the operand data, from the cache memory system to ones of the storage locations in the main memory, wherein each of the store requests has a respective address value in the main memory and only the store requests are scheduled in the store queue;

selecting, as a selected request, one of either the scheduled fetch requests or the scheduled store requests as the next request to be processed by the main memory and recording the group of storage locations which are then accessed by the selected request;

wherein the selected request is selected according to a predetermined priority scheme including the step of deferring priority from a highest priority, one of the scheduled store requests to another one of the scheduled requests if the group of storage locations to be used by the one scheduled store request is the same as the recorded group of storage locations which have been accessed by previously selected request.

2. The method set forth in claim 1 where the step of selecting one of either the fetch requests or the store request includes the step of assigning a priority to the fetch request which is higher than a priority assigned to the store request.

3. The method set forth in claim 1 where the main memory includes separately addressable memory locations and the step of selecting one of either the fetch request or the store request includes the steps of:

comparing the addressable memory locations to be used by each of the fetch and store requests with addressable memory locations used by each of a predetermined number of previous fetch and store requests; and selecting the store request before the fetch request if a match is found between memory locations to be used by the fetch request and memory locations used by any of the predetermined number of previous fetch and store requests.

4. A method in accordance with claim 3, in which the step of selecting one of the fetch request and the store request includes the step of assigning a priority to the fetch request which is higher than a priority assigned to the store request.

5. A method in accordance with claim 4, in which the cache memory system includes an N-way set associative cache memory with each data set including M data values and being stored in a respectively different one of N pages of said cache memory, where M and N are integers, said cache memory system including a list of data sets reserved for pending operations, said N data sets constituting a plurality of candidates for replacement, the method further comprising the steps of:

determining if any of the N page entries for the N data sets in the associated group of data sets is marked for a deferred replace operation;

if a selected one of the N pages entries is found to be marked as being subject to a deferred replace operation, eliminating the data set stored in the selected page as a candidate for replacement;

comparing the page entries to the list of reserved data sets to determine if the page entries for all of the candidates for replacement are reserved for pending operations;

if all of the page entries for the candidates for selection are reserved for pending operations, selecting one of said candidates for selection and marking the page entry corresponding to the selected candidate data set as being subject to a deferred replace operation;

scheduling said cache memory system to transmit the M operand data values in the selected data set to main memory when the status of the selected data set is no longer reserved for a previous fetch operation; and changing the status of the selected data set to be reserved for executing said deferred replace operation.

6. A method in accordance with claim 1, in which the main memory includes separately addressable memory locations and the step of selecting one of the fetch request and the store request includes the steps of:

comparing the addressable memory locations to be used by each of the fetch and store requests with addressable memory locations used by each of a predetermined number of previous fetch and store requests;

measuring a respective length of time for each respective one of said predetermined number of previous fetch and store requests, or respective said time measurement being initiated when each respective previous fetch and store request is selected; and selecting the store request before the fetch request if a match is found between memory locations to be used by the fetch request and memory locations used by any of the predetermined number of previous fetch and store requests for which a respective time measurement is less than a predetermined length of time.

7. In a computer system having a main memory and a central processing unit (CPU), a cache memory system for transferring data, including operand data, between the main memory, including a plurality of groups of storage locations, and the CPU comprising:

means for requesting fetch operations and store operations cache store means for holding the data values copied from ones of the storage locations in the main memory for access by the CPU;

fetch queue means for queueing only ones of the fetch request operations to copy the data, including the operand data, from the storage locations of the main memory to the cache store means, each fetch request operation having a distinct address in the main memory, said fetch queue means including a fetch queue;

store queue means for queueing only ones of the store request operations to copy the data, including the operand data, from the cache store means to the storage locations of the main memory, each store request operation having a distinct address in the main memory, said store queue means including a store queue distinct from said fetch queue; and request selection means, coupled to the main memory for selecting an operation to be processed by the main memory from among the store request operations provided by the store queue means and the fetch request operations provided by the fetch queue means according to a predetermined priority scheme said request selection means comprising:

means for storing an indication of the group of storage locations requested by a selected operation; and means for deferring priority from any of the store request operations with a highest priority provided by the store queue to another request operation, if the highest priority store request operation requests a storage location that corresponds to a location referenced by or stored indication of the group of storage locations requested by a previously selected ones of the store request operations and fetch request operations.

8. The cache memory system set forth in claim 7 wherein the fetch queue means and the store queue means provide a respective queued fetch request operation and store request operation to the request selection means simultaneously and the request selection means selects the fetch request operation provided by the fetch queue means preferentially to the store request operation provided by the store queue means.

9. The cache memory system set forth in claim 8 wherein the main memory is divided into a plurality of segments such that multiple request operations may be performed simultaneously using respectively different ones of said segments and said request selection means includes:

storage means for storing a plurality of values 8 which identify the memory segments used by N previous ones of the fetch and store request operations previously selected from said fetch queue means and said store queue means, respectively, where N is an integer greater than one;

means for comparing the memory segment to be used by each of the current fetch request operation and store request operation provided by said fetch queue means and said store queue means for a match to at least one of the memory segments held in said storage means for satisfying previous operation; and means for selecting for execution one of said current fetch request operation and store request operation for which no match is found by said comparing means over one of said current fetch request operation and store request operation for which a match is found by said comparing means.

10. The cache memory system set forth in claim 9 in which said request selection means includes:

means for measuring a respective length of time for each respective memory segment held in said storage means, with respective time measurements being initiated when respective previously selected ones of the request operations are scheduled to access said respective memory segments; and means for selecting for execution a store request operation provided by said store queue means to use one of said memory segments for which for which no match is found, over a fetch request operation provided by said fetch queue means to use one of said memory segments for which a match is found by said comparing means, and for which a respective measurement is less than said predetermined length of time.

* * * * *

UNITED STATES PATENT AND TRADEMARK OFFICE
CERTIFICATE OF CORRECTION

PATENT NO.    : 5,450,564
DATED         : September 12, 1995
INVENTOR(S)   : Joseph A. Hassler et al.

It is certified that error appears in the above-identified patent and that said Letters Patent is hereby corrected as shown below:

Column 12, claim 1, line 21, before "scheduled" delete "one" and insert --highest priority--.

Column 12, claim 2, line 27, change "request" to --requests--.

Column 12, claim 3, line 33, before "or" change "request" to --requests--; and after "store" change "request" to --requests--.

Column 14, claim 7, line 11, before "stored" change "or" to --a--.

Column 14, claim 7, line 12, after "by" delete --a---.

Column 14, claim 9, line 29, after "values" delete --8--.

Column 14, claim 9, line 40, change "satisfying" to --a--.

UNITED STATES PATENT AND TRADEMARK OFFICE
CERTIFICATE OF CORRECTION

PATENT NO.     : 5,450,564
DATED          : September 12, 1995
INVENTOR(S)    : Joseph A. Hassler et al.

It is certified that error appears in the above-identified patent and that said Letters Patent is hereby corrected as shown below:

Column 14, claim 10, line 63, before "measurement" insert --time--.

Column 14, claim, 10, line 63, after "than" change "said" to --a--.

Signed and Sealed this

Twenty-first Day of May, 1996

Attest:

BRUCE LEHMAN

Attesting Officer

Commissioner of Patents and Trademarks